(12) United States Patent
Dodd

(10) Patent No.: US 7,051,806 B2
(45) Date of Patent: May 30, 2006

(54) INTERNAL SLIP CONNECTOR

(76) Inventor: Rex A. Dodd, 2401 Neely, Midland, TX (US) 79705

( * ) Notice: Subject to any disclaimer, the term of this patent is extended or adjusted under 35 U.S.C. 154(b) by 139 days.

(21) Appl. No.: 10/669,839

(22) Filed: Sep. 24, 2003

(65) Prior Publication Data

US 2005/0061500 A1    Mar. 24, 2005

(51) Int. Cl.
*E21B 17/02* (2006.01)
(52) U.S. Cl. .............................. 166/242.2; 166/242.6; 403/347.4; 403/409.1
(58) Field of Classification Search ................ 166/208, 166/217, 242.2, 77.2, 77.51, 242.6, 139; 403/409.1, 374.4, 109.5, 22
See application file for complete search history.

(56) References Cited

U.S. PATENT DOCUMENTS

| | | | | | |
|---|---|---|---|---|---|
| 1,530,764 | A | * | 3/1925 | Milton | ........................ 166/208 |
| 2,060,593 | A | * | 11/1936 | Schaurte et al. | .............. 470/11 |
| 3,528,691 | A | * | 9/1970 | Matich, Jr. | ................... 403/356 |
| 4,113,395 | A | * | 9/1978 | Pawsat et al. | ................. 403/22 |
| 5,464,299 | A | * | 11/1995 | Scharer et al. | .............. 403/297 |
| 5,897,268 | A | * | 4/1999 | Deville | ..................... 403/109.5 |
| 6,837,646 | B1 | * | 1/2005 | Minger | ..................... 403/374.4 |

* cited by examiner

*Primary Examiner*—Kenneth Thompson
(74) *Attorney, Agent, or Firm*—Locke Liddell & Sapp LLP

(57) ABSTRACT

An internal slip connector useful for attaching tools or other devices to the inside wall of a conduit, the connector having a mandrel with a head end, a threaded end, a reduced-diameter shaft section disposed between the head end and the threaded end, two abutting slip segments loosely disposed around the mandrel between the head end and an upper extending portion of the threaded end, and a nut threaded onto the mandrel below the slip segments. When tightened following insertion of the slip segments into the conduit, the nut causes the slip segments to slide radially outward along an oblique interface between them. Gripping surfaces disposed on the outside of the slip segments are thereby pressed into engagement with the inside wall of the conduit. The internal slip connector can be used with coiled tubing of various wall thicknesses and is easily released after loosening the threaded nut.

26 Claims, 4 Drawing Sheets

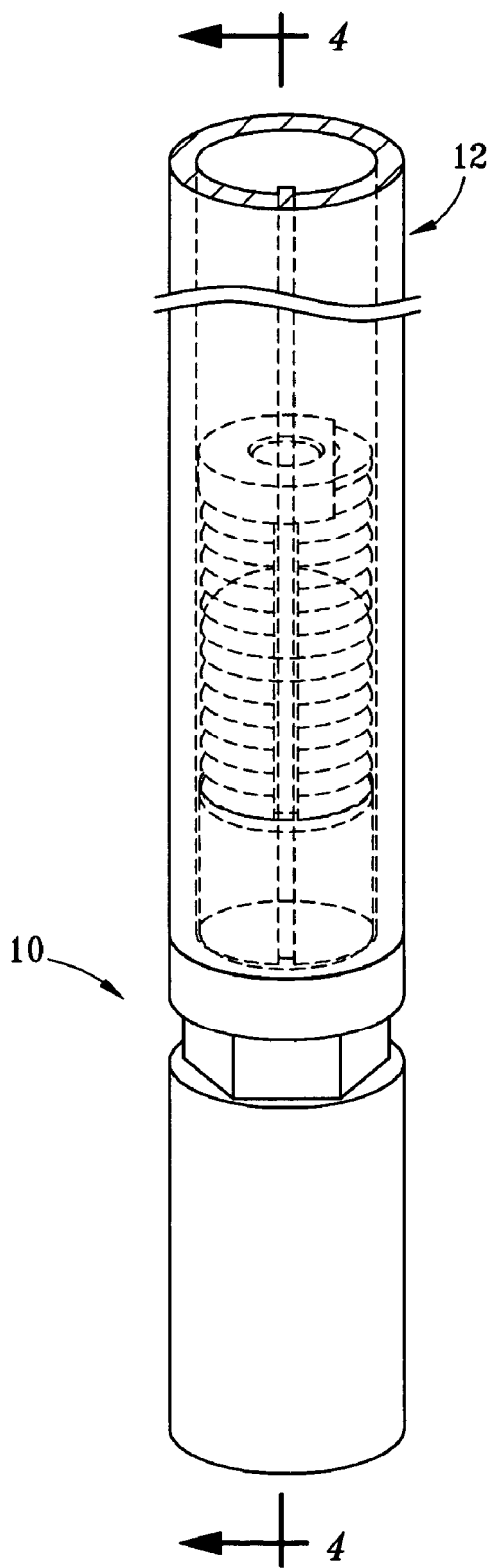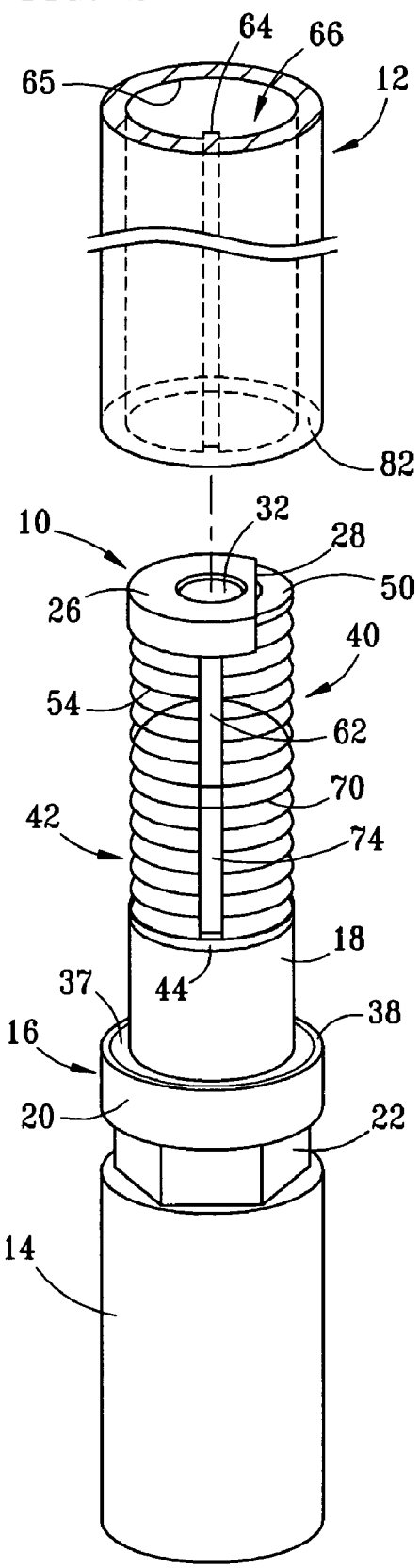

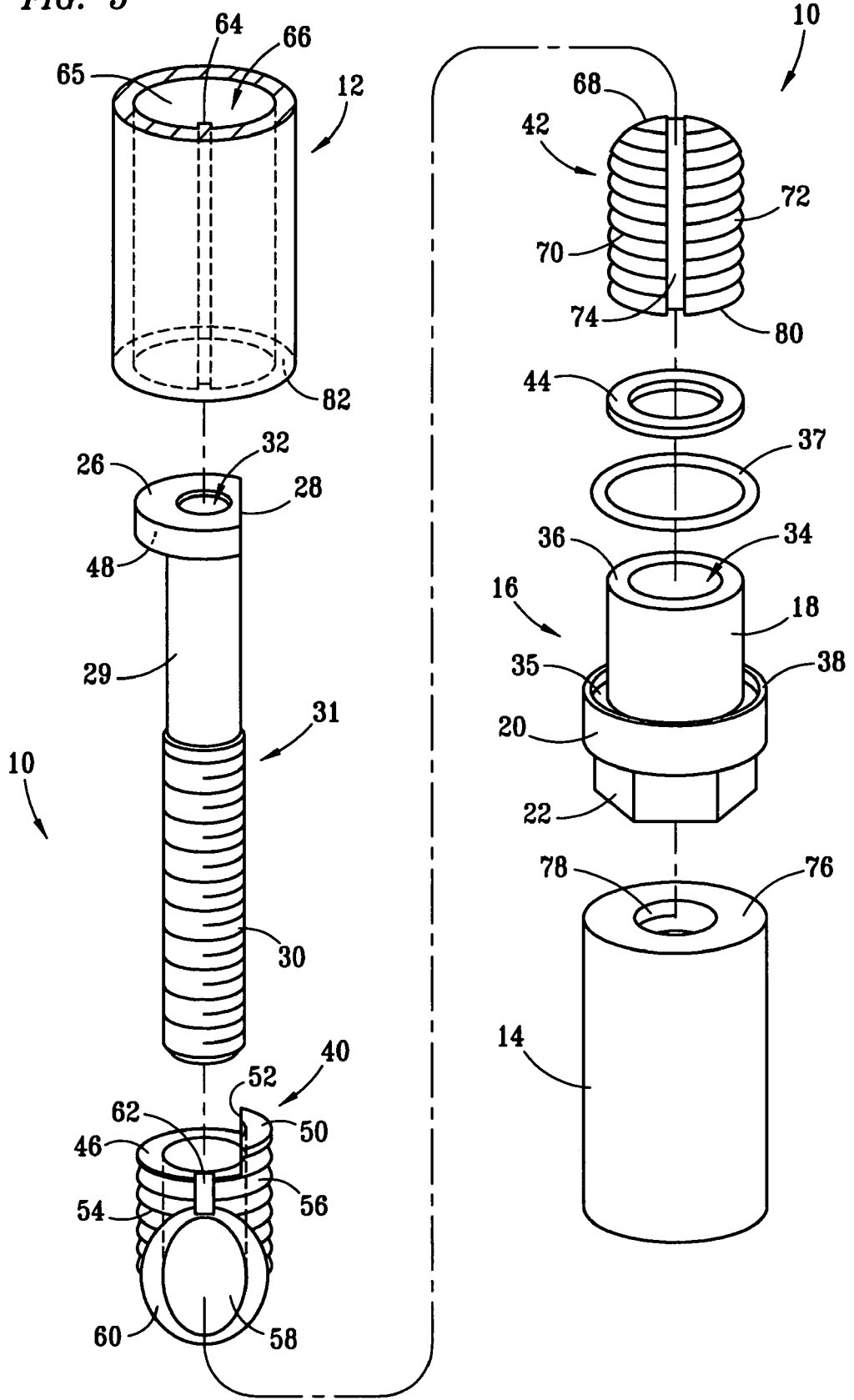

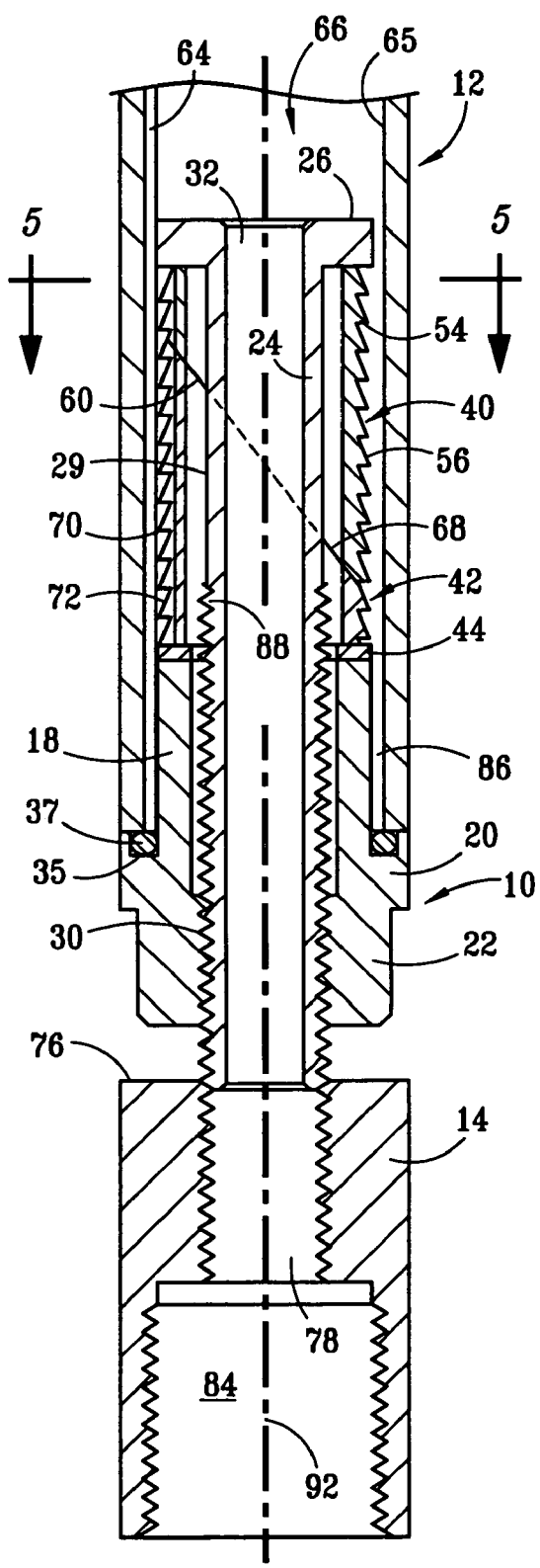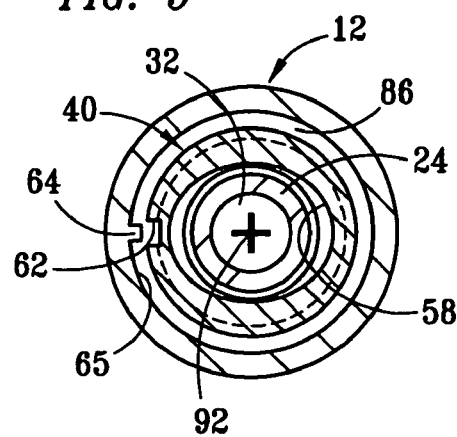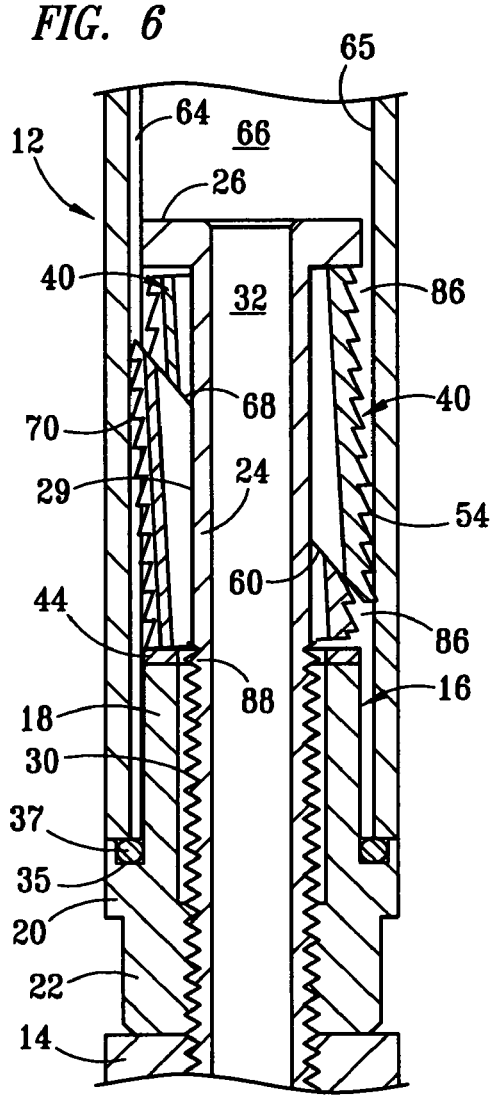

INTERNAL SLIP CONNECTOR

BACKGROUND OF THE INVENTION

1. Field of the Invention

This invention relates to apparatus useful for releasably securing one or more devices, especially well tools, to the free end of a conduit such as coiled tubing or pipe prior to running the conduit into a well bore.

2. Description of Related Art

The use of coiled tubing for running tools or other devices into the bore of an oil or gas well is well known. Coiled tubing is made of steel and is typically delivered to a well site on truck-mounted spools or reels and run into a well bore inside production tubing or casing that is already in place. Coiled tubing is made in various nominal diameters ranging, for example, from ¾ to 4½ inches, with nominal diameters of 1¼ inches to 2½ inches being quite common. Because coiled tubing is most often made by roll forming and welding a continuous strip of steel, a raised seam line often extends longitudinally down the inside wall of the tubing. Except for the seam line, the inside and outside wall surfaces of coiled tubing are typically smooth.

The use of external or internal slip connectors for releasably attaching well tools to coiled tubing and pipe is also well known. However, the conventional, commercially available slip connectors typically fit only a single wall thickness of tubing or pipe. Even for coiled tubing having a specified nominal diameter, the wall thickness and actual inside diameter can vary significantly depending upon factors such as manufacturer, material, use cycles, temperature, loading and the like. In the past it has been necessary, for example, to purchase and inventory as many as nine different sizes of slip connectors for use with coiled tubing having a nominal diameter of 1¼ inches.

Slip connectors are therefore needed that can be used easily and effectively with coiled tubing and pipe having different wall thicknesses for a given nominal diameter.

SUMMARY OF THE INVENTION

The invention disclosed herein is an internal slip connector that can be quickly and easily attached to, or released from, the inside wall of a conduit such as coiled tubing or pipe, and that is sufficiently adjustable to tightly engage the inside wall and withstand tensile loading without separation even where the wall thickness or the inside diameter vary significantly for a given nominal diameter.

According to a preferred embodiment of the invention, an internal slip connector is provided that is useful for attaching tools or other devices to the inside wall of a conduit, the connector comprising a mandrel with a head end, an externally threaded end opposite the head end, a reduced diameter shaft section disposed between the head end and the threaded end, and an axial bore; two cooperatively aligned slip segments disposed in loose sliding engagement around the mandrel between the head end and an upper extending portion of the threaded end; and a nut threaded onto the mandrel below the slip segments. When the nut is tightened following insertion of the slip segments into the conduit, the slip segments slide along an oblique interface where they abut each other and are canted apart slightly in opposite radial directions. A plurality of longitudinally spaced, arcuately extending teeth, wickers or other gripping surfaces disposed on the outside of the slip segments are thereby pressed into engagement with the inside wall of the conduit. The advancing movement of the threaded nut toward the mandrel head is stopped when the engagement force between the outer surface of the slip segments and the inside wall of the conduit is sufficiently great to support the weight of the tool or other device being attached to the conduit by the connector. A threaded collar is desirably provided below the threaded nut to act as a lock nut and also provide a threaded connection to tools or devices disposed below the connector.

Following use, the internal slip connector can be removed from the end of the conduit by loosening the threaded collar and nut, after which a minimal tensile force exerted between the conduit and connector will cause the slip segments to slide obliquely inward and out of engagement with the conduit wall, thereby releasing the connector from the conduit.

BRIEF DESCRIPTION OF THE DRAWINGS

The apparatus of the invention is further described and explained in relation to the following drawings wherein:

FIG. 1 is a simplified front perspective view of a preferred embodiment of the subject internal slip connector inserted inside the free end of a conduit prior to engagement of the slip segments with the conduit wall;

FIG. 2 is a perspective view as in FIG. 1 but showing the internal slip connector removed from the free end of the conduit;

FIG. 3 is an exploded perspective view of the internal slip connector of FIGS. 1 and 2;

FIG. 4 is an enlarged, cross-sectional elevation view of the internal slip connector and conduit taken along line 4—4 of FIG. 1, with the slip segments inserted into the free end of the conduit and coaxially aligned with the mandrel prior to engagement with the conduit wall;

FIG. 5 is a cross-sectional view taken along line 5—5 of FIG. 4;

FIG. 6 is a detail view of structure from FIG. 4, showing the slip segments canted out of coaxial alignment with the mandrel and into engagement with the inside wall of the conduit;

Like reference numerals are used to indicate like parts in all figures of the drawings.

DESCRIPTION OF THE PREFERRED EMBODIMENTS

Figure 7:
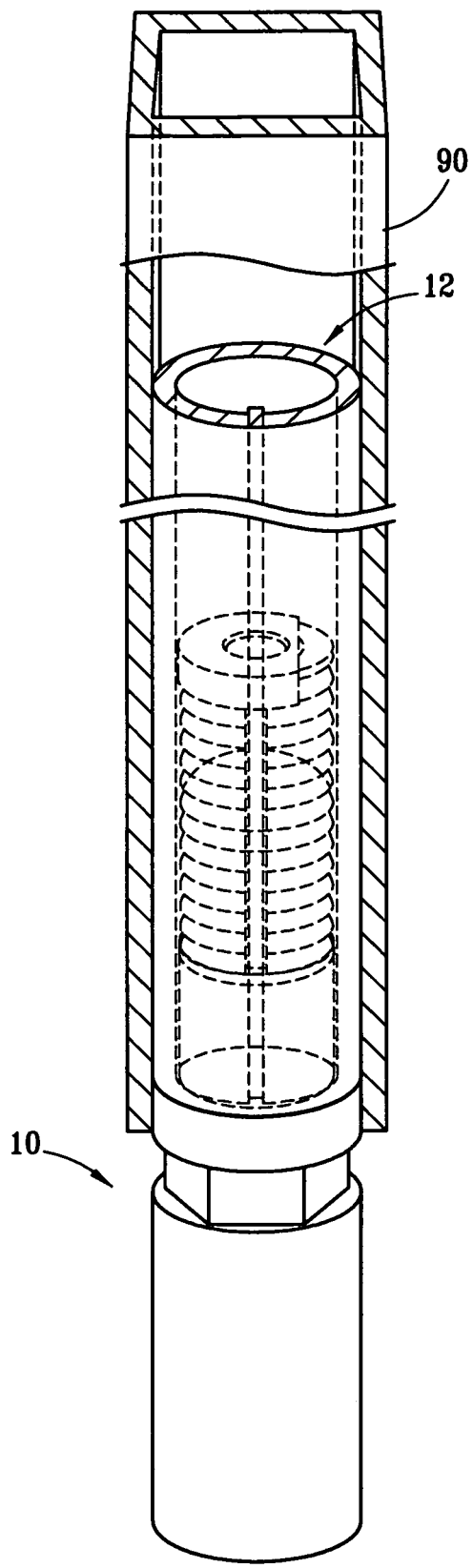
FIG. 7 is a simplified front perspective view of a preferred embodiment of the subject internal slip connector inserted inside the free end of a conduit as in FIG. 1, but showing a segment of square tubing disposed around the connector and conduit.

Referring to FIG. 1, internal slip connector 10 of the invention is shown with its top portion extending upwardly into the substantially cylindrical bore of a segment of coiled tubing 12. Referring to FIGS. 2 and 3, in which coiled tubing segment 12 is exploded away from internal slip connector 10, slip connector 10 further comprises collar 14, threaded nut 16, thrust washer 44, slip segments 40, 42, and mandrel 31 having head 26, shaft 29 with a diameter reduced relative to the maximum transverse dimension of the head, threaded lower end 30 and an axial bore 32. Coiled tubing 12 is generally cylindrical and comprises an inside wall 65 defining an axial bore 66. Seam 64, which is typically created when two edges are welded together during manufacture of the tubing, can project radially inward a small distance relative to the inside diameter of axial bore 66.

The threaded length of threaded end 30 of mandrel 31 is desirably long enough to allow threaded nut 16 and collar 14 a sufficient range of travel to fully engage and disengage inside wall 65 of coiled tubing during use as described in greater detail below. According to one preferred embodiment of the invention, head 26 further comprises flat side 28 and downwardly facing flange surface 48. Flat side 28 abuts against cooperatively aligned flat side 52 of upwardly projecting portion 50 of top slip segment 40 when internal slip connector 10 is assembled (FIG. 2), and prevents slip segments 40, 42 from rotating relatively to mandrel 29.

Top slip segment 40 preferably comprises a generally cylindrical body having an upwardly facing shoulder 46 that is generally perpendicular to inside wall 58 and is annular except where it steps upwardly at flat surface 52 of upwardly extending portion 50. Oblique surface 60 abuts and engages a cooperatively aligned surface 68 of bottom slip 42, and is preferably disposed at an angle ranging from about 45 to about 60 degrees to a plane perpendicular to the longitudinal axis through the mandrel. Although angles less than about 45 degrees and greater than about 60 degrees can also be used, they are less preferred for producing both the sliding engagement and the oppositely directed canting of slips 40, 42 that are desired during use of internal slip connector 10. Bottom slip segment 42 also preferably comprises a generally cylindrical body having oblique surface 68 at its top and an annular bottom shoulder 80. Bottom shoulder 80 is preferably substantially perpendicular to the inside wall of bottom slip segment 42. Vertical groove 62 of top slip segment 40 and vertical groove 74 of bottom slip segment 42 are preferably cooperatively alignable with seam 64 and are configured to receive seam 64 of coiled tubing segment 12 into engagement with them to limit rotational movement between coiled tubing segment 12 and slip segments 40, 42 when slip segments 40, 42 are tightened into engagement with inside wall 65.

Although the words "generally cylindrical" are used herein to describe the body of each of slip segments 40, 42, it should be understood that the term "generally cylindrical" primarily characterizes the round outside shape of slip segments 40, 42 when they are stacked in vertical alignment as shown in FIG. 2. Where oblique surfaces 60, 68 are disposed in aligned, abutting relationship to each other, they cooperate to define an elongate structure that appears to be cylindrical in shape except for the outwardly facing surface elements that serve as gripping surfaces. A particularly preferred gripping surface comprises a plurality of downwardly and outwardly inclined surfaces 56, 72 that each terminate in axially spaced, arcuately extending teeth or ridges 54, 70 that "bite" into inside wall 65 of coiled tubing during tightening of threaded nut 16. These outwardly facing gripping structures, sometimes referred to as "teeth" or "wickers," are merely intended to be examples of satisfactory gripping structures for use in slip connectors 10 of the invention. It will be appreciated upon reading this disclosure, however, that other similarly effective gripping structures can likewise be used on the outwardly facing surfaces of slip segments 40, 42 to provide tight frictional engagement with inside wall 65 of coiled tubing segment 12 during use. Slip segments 40, 42 are desirably made of a type of steel that is hard enough to withstand excessive deformation when, for example, teeth or ridges 54, 70 are tightened into engagement with inside wall 65 of coiled tubing 12. Satisfactory metals for use in making slip segments 40, 42 include P110 or 4140 steel, or an equivalent. P110 steel has a little higher tensile strength that 4140 and is therefore preferred.

Figure 8:
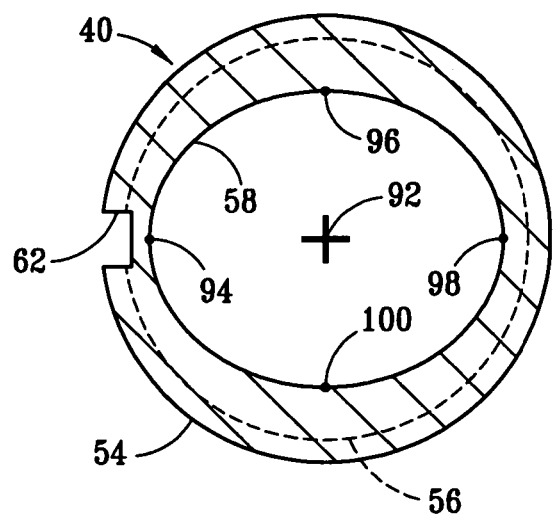
FIG. 8 is an enlarged, diagrammatic view identifying end points of the minimum and maximum transverse dimensions of the inside wall of the top slip segment as measured perpendicularly through the axial bore.

The preferred shape of the internal bore of slip segments 40, 42 is further described and explained in relation to FIG. 8, which depicts a cross-sectional view through top slip segment 40 (taken below surface 46). The internal bore geometry of bottom slip segment 42 is preferably substantially the same. Referring to FIG. 8, inside wall 58 of top slip segment 40 is desirably oval-shaped, with points 94, 98 identifying the ends of the maximum transverse dimension measured perpendicularly through longitudinal axis 92 and with points 96, 100 identifying the minimum transverse dimension measured perpendicularly through longitudinal axis 92. In this view, top slip segment 40 is rotated 90 degrees clockwise from the view shown in FIGS. 2 and 3, so that groove 62 is facing to the left side rather than forwardly. Although the language "oval-shaped" is used herein to describe a cross-sectional area that is elongated and facilitates more lateral movement in one direction relative to a centrally disposed mandrel than in a perpendicular direction in the same horizontal plane, it should be appreciated that such terminology is not intended necessarily to invoke the strict mathematical precision of an ellipse nor to preclude use of a more oblong bore having relatively parallel opposed sides disposed proximally to the mandrel. The functional purpose of the oval-shaped wall 58 is to facilitate some lateral movement of the slip segments in one direction while more closely limiting lateral movement in the perpendicular direction. This allows a portion of the gripping surfaces to engage the inside wall of the coiled tubing during tightening without excessive slack or wobbling that could result in misalignment or rotation between slip segments 40, 42. As used herein, the term "gripping surfaces" is not intended to suggest adhesion but rather a tight frictional engagement in which the surface irregularities on the slip segments improve the "bite" achieved when the slips are forced into engagement with the inside wall of the coiled tubing.

Referring again to FIGS. 2 and 3, thrust washer 44 is preferably made of brass and is intended to provide wear surfaces between the top of threaded nut 16 and bottom shoulder 80 of bottom slip segment 42 as threaded nut 16 is rotated upwardly toward head 26 of mandrel 31. One benefit of the present invention is that slip segments 40, 42 and thrust washer 44 are easily and conveniently replaceable between successive uses of mandrel 31, collar 14 and threaded nut 16 if excessive wear or deformation occurs during use.

Referring to FIG. 3, threaded nut 16 preferably further comprises an unthreaded upper section 18 having an upwardly facing annular surface 36 and a bore 34 with an inside diameter slightly greater than the outside diameter of threaded end 30 of mandrel 31. Annular flange member 20, has an outer diameter substantially the same as the outside diameter of coiled tubing 12, with an upwardly facing annular O-ring groove 35 for seating O-ring 37 prior to urging top shoulder 38 into abutting engagement with bottom end surface 82 of coiled tubing 12 prior to tightening threaded nut 16. Internally threaded hex head section 22 is desirably provided below flange member 20 to facilitate use of a wrench in tightening nut 16 on threaded end 30 of mandrel 31.

Cylindrical collar 14 is desirably provided for use as a lock nut to prevent threaded nut 16 from backing away from thrust washer 44 and lower slip segment 42 when under load, and for use in attaching other tools or devices to the coiled tubing beneath internal slip connector 10. Such other tools or devices are preferably attached to collar 14 by threaded engagement, and the lower portion of collar 14 can be provided with either box threads (as in FIG. 4) or with pin threads, as desired, or by any other known suitable means.

The operation of internal slip connector 10 is further described in relation to FIGS. 4–6. Referring to FIG. 4, mandrel head 26 and slip segments 40, 42 are shown fully inserted into coiled tubing 12, with O-ring 37 providing sealing engagement between annular space 86 inside coiled tubing 12 and flange member 20. Slip segments 40, 42 are coaxially aligned relative to longitudinal axis 92, and ridges or teeth 54, 70 of are not engaging inside wall 65 of coiled tubing segment 12. Collar 14 is threaded onto the bottom of threaded end 30 but is not yet tightened snugly against hex head 22. FIG. 5 is a cross-sectional view through FIG. 4 and depicts the position of mandrel wall 24 relative to oval-shaped inside wall 58 of slip segment 40. In FIG. 5, seam 64 is shown projecting inwardly from inside wall 65 of coiled tubing 12, and is aligned with but not engaging vertical groove 62 of slip segment 40.

The fully engaged position of internal slip connector 10 relative to coiled tubing segment 12 is shown in FIG. 6. In FIG. 6, hex head 22 has been rotated in a clockwise direction, causing unthreaded upper portion 18 to advance upwardly against thrust washer 44, which has in turn caused bottom slip segment 42 to push upwardly against top slip segment 40. As bottom slip segment 42 moves upwardly, oblique surface 68 slides along abutting oblique surface 60. Then, because further upward movement of slip segment 40 is impeded by mandrel head 26, ridges 70 near the top of bottom slip segment 42 and ridges 54 near the bottom of top slip segment 40 are canted outwardly into engagement with inside wall 65 of coiled tubing 12. Additional pressure exerted by the threaded nut 16 on slip segments 40, 42 causes slip segments 42, 40 to wedge tightly together along abutting oblique surfaces 60, 68, and causes ridges (teeth) 54, 70 to "bite" into even tighter frictional engagement with wall 65 of coiled tubing segment 12. Once hex head 22 of threaded nut 16 is tightened to the desired extent, collar 14 is desirably tightened snugly against it and additional tools or devices to be suspended from internal slip connector 10 are also attached to the bottom of collar 14.

It will be appreciated upon reading this disclosure that the preferred torque needed to reliably but releasably secure slip segments 40, 42 to coiled tubing 12 will depend upon many factors including, for example, the intended load to be suspended from internal slip connector 10, the diameter and wall thickness of the coiled tubing 12, the diameter and gauge of the threads on nut 16 and threaded end 30, and the relative hardness of the materials used in making slip segments 40, 42 and inside wall 65 of coiled tubing 12. For steel coiled tubing having a nominal diameter of 1.25 inches, a maximum typical design load is about 5000 pounds. In practice, nut 16 and collar 14 are tightened preliminarily and then a tensile load of about 1000 pounds is applied across the connection to "set" the teeth in wall 65 of coiled tubing 12. Nut 16 and collar 14 are then further tightened and a tensile load of about 3000 to about 5000 pounds is applied to insure a firm connection. Nut 16 and collar 14 are then tightened again if necessary, and the coiled tubing operation can continue. After completion, collar 14 and nut 16 are loosened and sufficient tensile force is applied to disengage slip segments 40, 42 from inside wall 65 of the coiled tubing 12.

In some cases, the material, diameter and wall thickness of coiled tubing 12 may cause concern that tightening the slip segments of internal slip connector 10 will deform coiled tubing 12. In such cases, a segment of square tubing 90, if positioned substantially as shown in FIG. 7, can be utilized to maintain dimensional stability of coiled tubing 12 during tightening.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor is legally entitled.

I claim:

1. A slip connector releasably attachable to an inside wall of a conduit, comprising:
   a mandrel having a head end, a threaded end, a reduced-diameter cylindrical shaft section disposed between the head end and the threaded end, a longitudinal axis and an axial bore;
   two cooperatively alignable slip segments disposed around the mandrel between the head end and an upper extending portion of the threaded end, the slip segments abutting along facing oblique surfaces, each slip segment having a generally cylindrical outer wall comprising arcuately extending gripping structures and an internal bore permitting lateral movement of the slip segments relative to the mandrel; and
   a nut threaded onto the mandrel below the slip segment; whereby
   the slip segments are insertable into the conduit and upward movement of the nut on the upper extending portion of the threaded end following insertion causes the slip segments to cant outwardly in opposite directions and into engagement with the inside wall of the conduit.

2. The slip connector of claim 1 wherein relative rotation between the slip segments and the mandrel is limited.

3. The slip connector of claim 2 wherein the mandrel head has a flat side.

4. The slip connector of claim 3, wherein the two slip segments comprise top and bottom slip segments, the top slip segment having an upwardly projecting section that is disposed in facing relation to the flat side and limiting rotation of the top slip segment relative to the mandrel head.

5. The slip connector of claim 1, having top and bottom slip segments and further comprising a thrust washer disposed between the bottom slip segment and the nut.

6. The slip connector of claim 1 wherein the nut further comprises an upwardly facing annular flange.

7. The slip connector of claim 6 wherein the conduit has an end surface that abuts against the annular flange.

8. The slip connector of claim 6 wherein the annular flange comprises an upwardly facing annular channel.

9. The slip connector of claim 8 wherein a sealing ring is seated in the annular channel.

10. The slip connector of claim 6 wherein the threaded nut further comprises an upwardly extending, unthreaded neck portion disposed above the annular channel, and wherein a thrust washer abuts an annular top surface of the neck portion.

11. The slip connector of claim 1 wherein each slip segment comprises an elongate inside wall defining a central bore having an oval-shaped cross-section.

12. The slip connector of claim 9 wherein the oval-shaped cross-sections of the top and bottom slip segments are coaxially alignable with the axial bore of the mandrel.

13. The slip connector of claim 11 wherein the central bore of each slip segment has a minimum transverse dimension as measured perpendicularly through the longitudinal axis that restricts lateral movement of the slip segment relative to the mandrel.

14. The slip connector of claim 11 wherein the central bore of each slip segment has a maximum transverse dimension as measured perpendicularly through the longitudinal axis that allows lateral movement of the slip segment relative to the mandrel.

15. The slip connector of claim 14 wherein the lateral movement allows the slip segment to cant outwardly from the mandrel in the direction of the maximum transverse dimension.

16. The slip connector of claim 1 wherein the oblique surfaces of the slip segments are slidably engaged.

17. The slip connector of claim 1 wherein the conduit is coiled tubing.

18. The slip connector of claim 17, wherein the slip segments each comprise an outwardly facing, longitudinal groove cooperatively aligned with a seam projecting inside the coiled tubing.

19. The slip connector of claim 1 wherein the conduit is pipe.

20. The slip connector of claim 1 wherein the gripping structures comprise a plurality of axially spaced, arcuately extending, downwardly inclined teeth.

21. The slip connector of claim 1 wherein the gripping structures are wickers.

22. The slip connector of claim 1, further comprising a collar threaded onto the threaded end of the mandrel below the threaded nut.

23. The slip connector of claim 22 wherein the collar further comprises threads attachable to another device disposed below the slip connector.

24. The slip connector of claim 1 wherein the oblique surfaces are inclined at an angle ranging from about 30 to about 45 degrees from a plane perpendicular to the longitudinal axis.

25. The combination of the slip connector of claim 1 with a square tubing segment proximally around the slip connector during engagement of the slip segments with the inside wall of the conduit.

26. The slip connector of claim 1 wherein the slips are made of P110 stainless steel.

* * * * *